United States Patent
Zhang et al.

(10) Patent No.: US 11,112,923 B2
(45) Date of Patent: Sep. 7, 2021

(54) TOUCH SCREEN, MANUFACTURING METHOD THEREOF, AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Chuanwen Zhang, Beijing (CN); Zhao Dong, Beijing (CN); Wenjin Fan, Beijing (CN); Bisheng Li, Beijing (CN); Jiawei Xu, Beijing (CN); Baoran Li, Beijing (CN)

(73) Assignees: Hefei Xinsheng Optoelectronics Technology Co., Ltd., Hefei (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/831,994

(22) Filed: Mar. 27, 2020

(65) Prior Publication Data
US 2021/0141494 A1 May 13, 2021

(30) Foreign Application Priority Data
Nov. 7, 2019 (CN) .......................... 201911080585.1

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 2203/04103* (2013.01); *G06F 2203/04112* (2013.01)

(58) Field of Classification Search
CPC ................. G06F 3/0448; G06F 3/0412; G06F 2203/04103; G06F 2203/04112
See application file for complete search history.

(56) References Cited

U.S. PATENT DOCUMENTS

| | | | |
|---|---|---|---|
| 6,917,391 B1* | 7/2005 | Faris | H04N 13/341 349/12 |
| 2011/0102331 A1* | 5/2011 | Philipp | G06F 3/047 345/173 |
| 2017/0205912 A1* | 7/2017 | Li | G06F 3/0445 |
| 2020/0350512 A1* | 11/2020 | Guo | G06F 3/0443 |

* cited by examiner

*Primary Examiner* — Sahlu Okebato
(74) *Attorney, Agent, or Firm* — Arent Fox LLP; Michael Fainberg (57) ABSTRACT

A touch screen, a manufacturing method thereof, and a display device. The touch screen includes: a plurality of mutually independent touch detection regions. Each touch detection region includes a plurality of strip transparent electrodes arranged along a first direction and extending along a second direction, and a plurality of mesh electrodes arranged along the second direction and extending along the first direction. The strip transparent electrodes and the mesh electrodes are insulated from each other, and the second direction is intersected with the first direction. Strip ground electrodes extending along the second direction exist between every two adjacent touch detection regions arranged along the first direction, and the strip ground electrodes and the strip transparent electrodes are disposed on the same layer.

15 Claims, 5 Drawing Sheets

TOUCH SCREEN, MANUFACTURING METHOD THEREOF, AND DISPLAY DEVICE

CROSS-REFERENCE TO RELATED APPLICATION

This application claims priority of Chinese Patent Application No. 201911080585.1, filed on Nov. 7, 2019, which is hereby incorporated by reference in its entirety.

FIELD

The present disclosure relates to the technical field of displaying, and more particularly relates to a touch screen, a manufacturing method thereof, and a display device.

BACKGROUND

With the continuous development of capacitive touch screens, people have increasing demands for large-sized touch screens.

At present, the large-sized capacitive touch screens are mainly realized through a technology of exposure and splicing of mask plates. Specifically, double-layer metal meshes overlap through baffle plates, thereby forming full-surface touch.

SUMMARY

According to a first aspect, the embodiment of the present disclosure provides the touch screen, including:
 a plurality of mutually independent touch detection regions.
 the touch detection region respectively includes a plurality of strip transparent electrodes arranged along a first direction and extending along a second direction, and a plurality of mesh electrodes arranged along the second direction and extending along the first direction; the strip transparent electrodes and the mesh electrodes are insulated from each other, and the second direction is intersected with the first direction.
 strip ground electrode extending along the second direction exist between every two adjacent touch detection regions arranged along the first direction, and the strip ground electrodes and the strip transparent electrodes are disposed on the same layer.

Optionally, each touch detection region further includes a strip redundant electrode located between every two adjacent strip transparent electrodes; the mesh electrodes respectively overlap with a corresponding strip redundant electrode.

Optionally, the touch detection region respectively further include a first insulating layer disposed between a layer where the corresponding strip transparent electrodes are placed and a layer where the corresponding mesh electrodes are placed; the first insulating layers include a hole structure opposite to the strip redundant electrodes; the mesh electrodes respectively overlap with a corresponding strip redundant electrodes through the hole structure; an orthographic projection of any one of the strip redundant electrodes on the touch screen is greater than or equal to an orthographic projection of the hole structure on the touch screen.

Optionally, the strip redundant electrodes and the strip transparent electrodes have connection terminals on the same sides.

Optionally, the touch detection regions respectively further include a mesh redundant electrode located between every two adjacent mesh electrodes.

Optionally, the touch detection region respectively further include a second insulating layer disposed on a side, away from the layer where the corresponding strip transparent electrodes are placed, of the layer where the corresponding mesh electrodes are placed.

Optionally, a shape of the mesh electrodes is rhombic, or square, or hexagonal.

According to a second aspect, an embodiment of the present disclosure provides the display device, including: the touch screen as mentioned above.

Optionally, an orthographic projection of the touch detection region on the touch screen is slightly larger than an orthographic projection of a display region on the touch screen.

According to a third aspect, an embodiment of the present disclosure provides the manufacturing method of the touch screen, including:
 dividing the touch screen into a plurality of mutually independent touch detection regions;
 sequentially forming a plurality of strip transparent electrodes arranged along a first direction and extending along a second direction in the touch detection regions, and forming a plurality of strip ground electrodes extending along the second direction between every two adjacent touch detection regions arranged along the first direction, wherein the second direction is intersected with the first direction;
 forming a plurality of mesh electrodes arranged along the second direction and extending along the first direction in the touch detection regions, wherein the strip transparent electrodes and the mesh electrodes are insulated from each other.

Optionally, when forming the plurality of strip transparent electrodes arranged along the first direction and extending along the second direction in the touch detection regions, the method further includes:
 forming a strip redundant electrode between every two adjacent strip transparent electrodes in the touch detection regions, wherein the mesh electrodes respectively overlap with a corresponding strip redundant electrode.

Optionally, when the plurality of mesh electrodes arranged along the second direction and extending along the first direction in the touch detection regions, the method further includes:
 forming a mesh redundant electrode extending along the first direction between every two adjacent mesh electrodes.

DETAILED DESCRIPTION OF THE EMBODIMENTS

It should be understood that in the description of the embodiments of the present disclosure, words such as "first" and "second" are only configured to distinguish descriptions, and cannot be understood as indicating or implying the relative importance, nor as indicating or implying an order.

It should be understood that the preferred embodiments described below are merely to illustrate and explain the present disclosure, and not intended to limit the present disclosure. Furthermore, the embodiments in this application and features in the embodiments may be combined with each other without conflicts. Furthermore, the shapes and sizes of all components in drawings do not reflect real scales, and are merely to illustrate the contents of the present disclosure.

Figure 1:
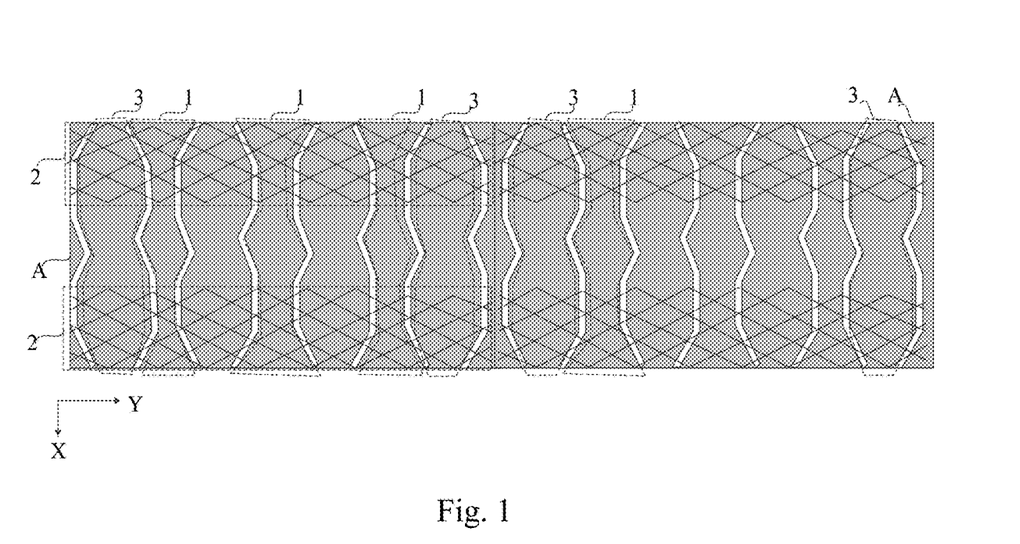
FIG. 1 is a schematic structural diagram of a touch screen provided by the embodiment of the present disclosure.

FIG. 1 illustrates a schematic structural diagram of a touch screen provided by the embodiment of the present disclosure. The touch screen includes:

a plurality of mutually independent touch detection regions A.

Each touch detection region A includes a plurality of strip transparent electrodes 1 arranged along a first direction and extending along a second direction, and a plurality of mesh electrodes 2 arranged along the second direction and extending along the first direction. The strip transparent electrodes 1 and the mesh electrodes 2 are insulated from each other, and the second direction is intersected with the first direction.

Strip ground electrode 3 extending along the second direction exist between every two adjacent touch detection regions A arranged along the first direction, and the strip ground electrodes 3 and the strip transparent electrodes are disposed on the same layer.

In the embodiment of the present disclosure, the plurality of strip transparent electrodes 1 arranged along the first direction and extending along the second direction and the plurality of mesh electrodes 2 arranged along the second direction and extending along the first direction are disposed in each touch detection region A, and the strip transparent electrodes 1 and the mesh electrodes 2 are insulated from each other. The strip ground electrodes 1 extending along the second direction and disposed on the same layer where the strip transparent electrodes 1 are placed are disposed between every two adjacent touch detection regions A arranged along the first direction. That is, the plurality of mesh electrodes overlap the plurality of strip transparent electrodes to form the corresponding touch detection regions A, and the strip ground electrodes 3 are disposed between every two adjacent touch detection regions, thereby ensuring independent touch of each touch detection region A. Since each touch detection region A of the touch screen can independently realize touch without affecting each other, the touch sensitivity of the touch screen is improved.

In a specific implementation process, there may be two, or three or more than three touch detection regions A of the touch screen. FIG. 1 illustrates one situation that there are two touch detection regions A of the touch screen. Of course, those of skilled in the art can set the number of the touch detection regions A of the touch screen according to an actual need, and it is not limited here.

In the specific implementation process, each touch detection region A includes the plurality of strip transparent electrodes 1 arranged along the first direction and extending along the second direction, and the plurality of strip ground electrodes 3 disposed on the same layer where the strip transparent electrodes are placed, disposed between every two adjacent touch detection regions A arranged along the first direction and extending along the second direction. The strip transparent electrodes 1 and the strip ground electrodes 3 may be made of transparent conductive materials, such as indium tin oxide (ITO) and indium zinc oxide (IZO). Of course, in actual application, the strip transparent electrodes 1 and the strip ground electrodes 3 may further be designed by selecting corresponding materials according to an actual application environment, and it is not limited here. In addition, the strip transparent electrodes 1 and the strip ground electrodes 3 are set to be in transparent states, thereby improving the transmittance of the touch screen, and improving the usability of the touch screen.

In the specific implementation process, when the strip transparent electrodes 1 and the strip ground electrodes 3 are both ITO materials, the strip transparent electrodes 1 may be patterned ITO conductive layers, and the strip ground electrodes 3 may be unrouted ITO dummy patterns reserved on the ITO conductive layers. The strip ground electrodes 3 are grounded, so that every two adjacent touch detection regions A are not connected at spliced positions, thereby ensuring the touch independence of every two adjacent touch detection regions A. In addition, the mesh electrodes 2 at the spliced positions of every two adjacent touch detection regions A do not need to be aligned and connected, which further ensures the touch independence of the two adjacent touch detection regions A. Furthermore, compared with accurate alignment required in full-face touch in the related art, a manufacturing process is simpler. In addition, orthographic projections of the strip transparent electrodes 1 on a plane where the touch screen is placed may be of a regular rectangular shape, or may be of an irregular broken line shape as shown in FIG. 1, of course can further be other shapes in actual application, and it is not limited here.

In the specific implementation process, an edge, opposite to edges of the spliced positions of other regions, of each touch detection region A may also be provided with the corresponding strip ground electrodes 3, as shown in FIG. 1. The strip ground electrodes 3 at the edge of each touch detection region A are grounded, thereby effectively avoiding interference of an external circuit to an internal circuit corresponding to the touch detection regions A and improving the touch sensitivity of the touch screen.

In the specific implementation process, materials of the mesh electrodes 2 may be metal materials, or may be other materials, such as graphene, and it is not limited here. The mesh electrodes 2 have relatively low resistance and higher touch sensitivity correspondingly since they have mesh structures. In addition, the mesh structures of the mesh electrodes 2 may be rhombic, or square, or hexagonal, and the like, and it is not limited here.

In the specific implementation process, the strip transparent electrodes 1 and the mesh electrodes 2 are insulated from each other, thereby effectively avoiding short circuiting between the strip transparent electrodes 1 and the mesh electrodes 2. In addition, the number of the strip transparent electrodes 1 may be equal or unequal to the number of the mesh electrodes 2. Of course, those of skilled in the art can set the number of the strip transparent electrodes 1 and the number of the mesh electrodes 2 according to an actual application scenario, and it is not limited here.

In the specific implementation process, every two adjacent strip transparent electrodes 1 may be disposed at an equal distance or an unequal distance. Correspondingly, every two adjacent mesh electrodes 2 may be disposed at an equal distance or an unequal distance. Of course, those of skilled in the art can set a spacing distance between corresponding electrodes according to the actual application scenario, and it is not limited here.

In the embodiment of the present disclosure, when the touch screen includes touch chips, since the touch chips need to bind to flexible circuit boards so as to input touch detection signals from the outside into the touch chips through the flexible circuit boards, regions where signal lines corresponding to the touch detection signals are connected to the touch chips are binding regions. That is, the touch screen may also include the binding regions. The second direction may be a direction close to the binding region along the touch detection regions A, such as the direction represented by the arrow X in FIG. 1. Correspondingly, the first direction may be a direction perpendicular to the second direction X, such as the direction represented by the arrow Y in FIG. 1. The second direction may also be a direction not perpendicular to, but intersected with, the first direction. Of course, those of skilled in the art can also set specific orientations of the first direction and the second direction according to the requirement of the actual application scenario, and it is not limited here.

Figure 2:
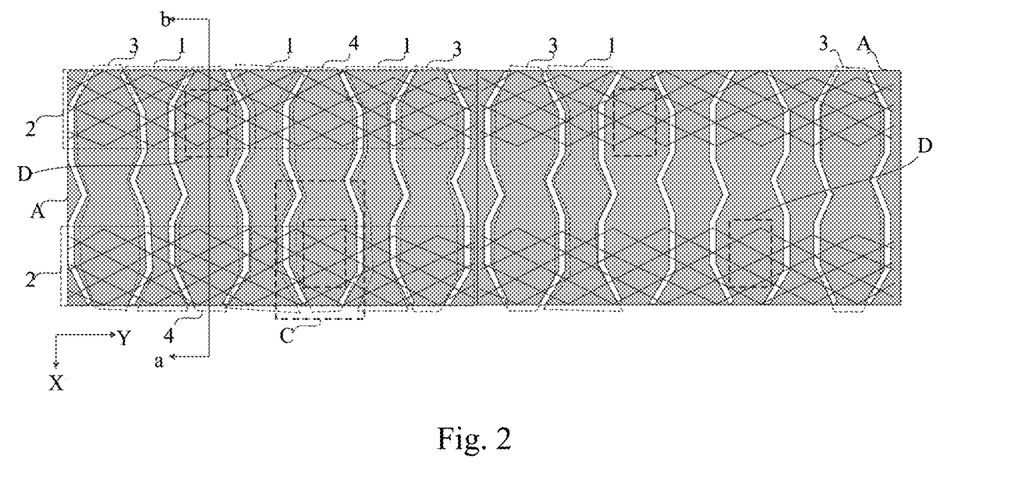
FIG. 2 is a schematic structural diagram of the touch screen including strip redundant electrodes, which is provided by the embodiment of the present disclosure.

In the embodiment of the present disclosure, FIG. 2 is a schematic structural diagram of the touch screen including strip redundant electrodes 4. Specifically, each touch detection region A further includes the strip redundant electrode 4 located between every two adjacent strip transparent electrodes 1. Each mesh electrode 2 overlaps the corresponding strip redundant electrode 4. For example, overlap regions between the mesh electrodes 2 and the strip redundant electrodes 4 are represented by regions D in FIG. 2. Each touch detection region A in FIG. 2 includes the two corresponding overlap regions D. Therefore, after the touch detection regions A receive touch detection signals, the touch detection signals are output through the strip redundant electrodes 4. At this time, the strip redundant electrodes 4 serve lines. In this way, no extra lines need to be laid. The lines are disposed in the surfaces of the touch detection regions A to realize transmission of the touch detection signals, so that the manufacturing process of the touch screen is simplified.

Figure 3:
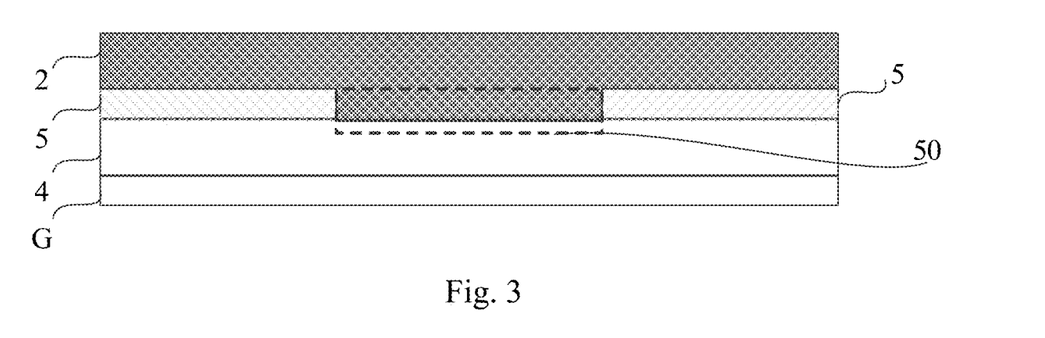
FIG. 3 is a schematic sectional diagram of a film layer structure of the touch screen in FIG. 2 along a direction from a to b.

In the embodiment of the present disclosure, the touch screen includes a substrate, and the strip transparent electrodes 1, the strip ground electrodes 3, and the strip redundant electrodes 4 are all disposed on the substrate. The substrate may be a glass substrate, or a tempered substrate, and it is not limited here. FIG. 3 is a schematic sectional diagram of a film layer structure of the touch screen in FIG. 2 along a direction from a to b. The reference sign G in FIG. 3 denotes the substrate. Specifically, each touch detection region A further includes a first insulating layer 5 disposed between a layer where the strip transparent electrodes 1 are placed and a layer where the mesh electrodes 2 are placed. The first insulating layers 5 include hole structures 50 opposite to the strip redundant electrodes 4. The mesh electrodes 2 overlap the strip redundant electrodes 4 through the hole structures 50. Orthographic projections of the strip redundant electrodes 4 on the touch screen are greater than or equal to orthographic projections of the hole structures 50 on the touch screen. In the specific implementation process, the orthographic projections of the strip redundant electrodes 4 on the touch screen are greater than or equal to the orthographic projections of the hole structures 50 on the touch screen, so that the mesh electrodes 2 and the strip redundant electrodes 4 may be in full contact and conducted, thereby improving the touch sensitivity of the touch detection regions A and then improving the touch sensitivity of the touch screen.

Figure 4:
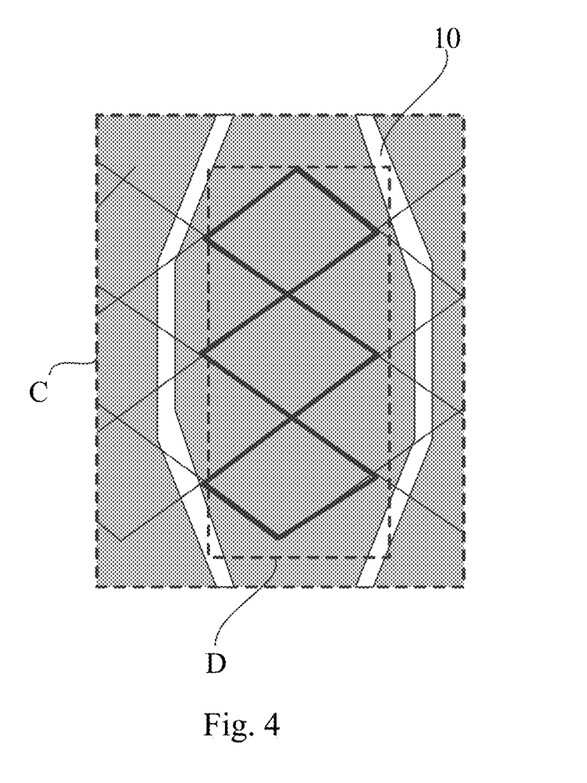
FIG. 4 is a partially enlarged view of regions C, including overlap regions D, in touch detection regions A in FIG. 2.

In the specific implementation process, FIG. 4 is a partially enlarged view of regions C, including the overlap regions D, in the touch detection regions A in FIG. 2. In the specific implementation process, first grooves 10 may be etched between the adjacent strip redundant electrodes 4 and the strip transparent electrodes 1, and the first grooves 10 may be etched between the strip ground electrodes 3 and the strip transparent electrodes 1, thereby effectively preventing signal crosstalk between a receiving channel and a driving channel, improving the touch sensitivity of the touch detection regions A and then improving the touch sensitivity of the touch screen. In actual application, an orthographic projection of each first groove 10 on the plane where the touch screen is placed may be in a regular shape, such as a rectangle, or may be in an irregular shape, such as a broken line shape shown in FIG. 4. Of course, the orthographic projection may be in other shape designs, and it is not limited here.

Figure 5:
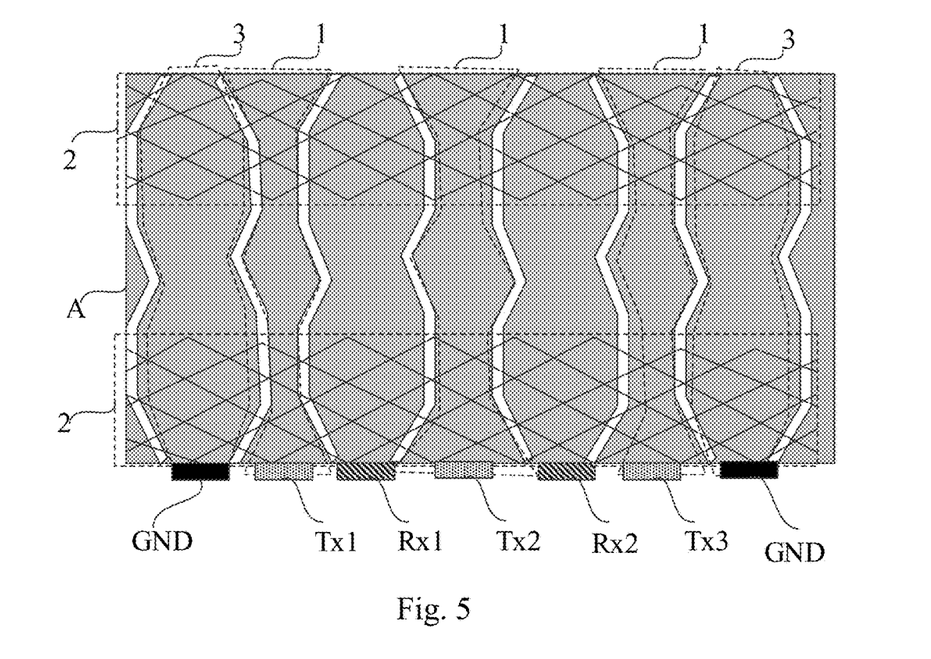
FIG. 5 is a schematic arrangement diagram illustrating that same sides of touch detection regions A in the touch screen provided by the embodiment of the present disclosure are provided with connection terminals.

In the embodiment of the present disclosure, FIG. 5 is a schematic arrangement diagram illustrating that the same sides of the touch detection regions are provided with connection terminals. Specifically, the strip redundant electrodes 4 and the strip transparent electrodes 1 are provided with the connection terminals on the same sides. As shown in FIG. 5, the strip redundant electrodes 4 have the corresponding terminals Tx1, Tx2 in the touch detection regions A. The strip transparent electrodes 1 have the corresponding terminals Rx1, Rx2 and Rx3 in the touch detection regions A. In addition, the strip ground electrodes 3 have corresponding ground terminals GND in the touch detection regions A. In actual application, the lines may be introduced into the binding regions through the connection terminals on the same sides to realize electrical connection with the touch chips, thereby realizing narrow-frame design of the touch screen.

Figure 6:
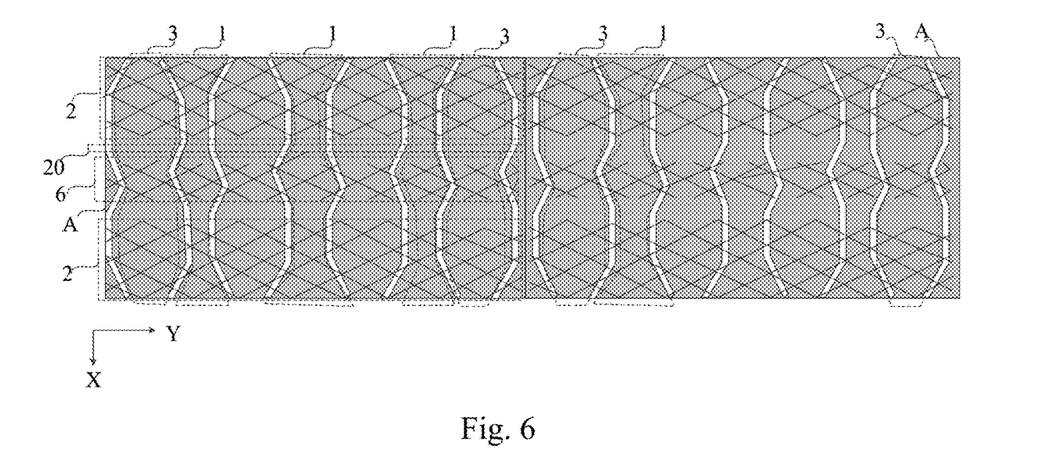
FIG. 6 is a schematic diagram illustrating that the touch detection regions A in the touch screen provided by the embodiment of the present disclosure include mesh redundant electrodes.

In the embodiment of the present disclosure, FIG. 6 is one of schematic diagrams illustrating that the touch detection regions A include mesh redundant electrodes 6. Specifically, each touch detection region A further includes the mesh redundant electrode 6 located between every two adjacent mesh electrodes 2. In the specific implementation process, the mesh redundant electrodes 6 and the mesh electrodes 2 are disposed on the same layer. Second grooves 20 may be etched between the adjacent mesh redundant electrodes 6 and mesh electrodes 2, so that a plurality of touch detection channels may be formed in same-layer structures, and then the touch sensitivity of the touch screen is improved. In actual application, an orthographic projection of each second groove 20 on the plane where the touch screen is placed may be of a regular shape, such as a rectangle, as shown in FIG. 6, or may be of an irregular shape. Of course, the orthographic projection may be in other shape designs, and it is not limited here.

Figure 7:
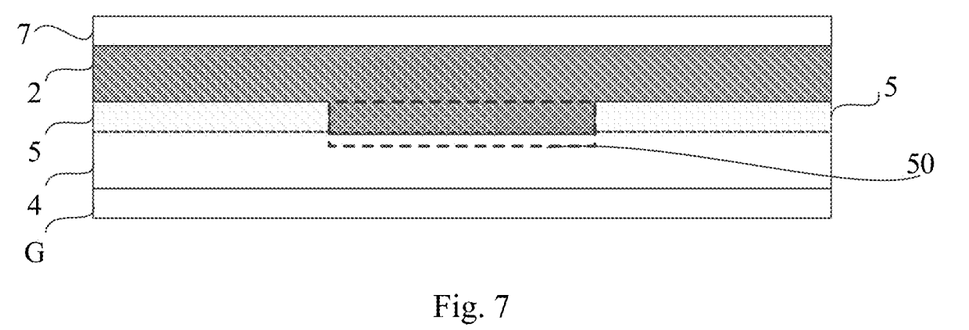
FIG. 7 is a schematic sectional diagram of one film layer structure including second insulating layers in the touch screen in FIG. 2 along the direction from a to b.

In the embodiment of the present disclosure, FIG. 7 is a schematic sectional diagram of one film layer structure including second insulating layers 7 in the touch screen in FIG. 2 along the direction from a to b. specifically, each touch detection region A further includes the corresponding second insulating layer 7 disposed on a side, away from the layer where the strip transparent electrodes 1 are placed, of the layer where the mesh electrodes 2 are placed. Therefore, damage caused by external water, oxygen, and the like to the mesh electrodes 2 and the strip transparent electrodes 1 is avoided, and damage caused by external signals such as static electricity to the internal circuit of the touch screen is avoided, thus prolonging the service life of the touch screen.

The touch screen provided by the embodiment of the present disclosure may be an on cell touch screen, or may be an in cell touch screen, and it is not limited here.

Figure 8:
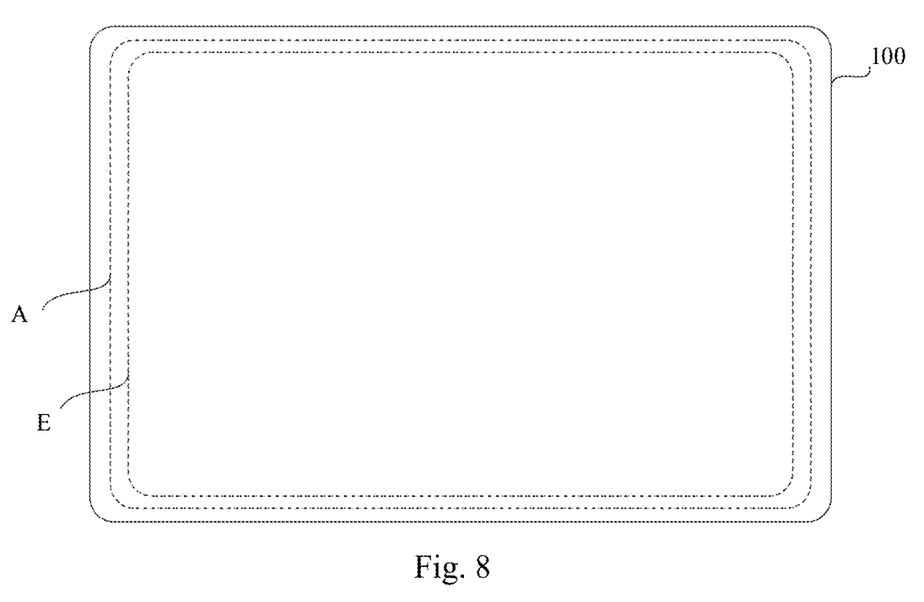
FIG. 8 is a schematic structural diagram of a display device provided by the embodiment of the present disclosure.

Based on the same inventive concept, FIG. 8 is one schematic structural diagram of a display device provided by the embodiment of the present disclosure. Specifically, the display device includes the aforementioned touch screen 100. When the touch screen 100 is applied to the display device, the touch detection regions A of the touch screen 100 need to be matched with a display region E of a display panel. In this figure, the dotted line frame A denotes the touch detection regions, and the dotted line frame E denotes the display region. In order to guarantee the touch performance in the display region, it is preferred that the projection area of the touch detection regions A on the plane where the touch screen 100 is placed is slightly larger than the projection area of the display region E on the plane where the touch screen 100 is placed. Each touch electrode may slightly extend out of the touch detection regions A, or may be flush with the edges of the touch detection regions A. In actual application, this may be designed according to an actual requirement, and it is not limited here.

The display device may be applied to any product or component having a display function, such as a mobile phone, a tablet computer, a television, a display, a notebook computer, a digital photo frame and a navigator. The principle of the display device for solving problems is similar to that of the touch screen, so that the implementation of the display device may refer to the implementation of the above touch screen, and repeated descriptions will be omitted.

According to the display device provided by the embodiment of the present disclosure, the plurality of strip transparent electrodes 1 arranged along the first direction and extending along the second direction and the plurality of mesh electrodes 2 arranged along the second direction and extending along the first direction are disposed in each touch detection region A, and the strip transparent electrodes 1 and the mesh electrodes 2 are insulated from each other. The strip ground electrodes 3 extending along the second direction and disposed on the same layer where the strip transparent electrodes 1 are placed are disposed between every two adjacent touch detection regions A arranged along the first direction. That is, the plurality of mesh electrodes overlap the plurality of strip transparent electrodes to form the corresponding touch detection regions A, and the strip ground electrodes 3 are disposed between every two adjacent touch detection regions, thereby ensuring independent touch of each touch detection region A. Since each touch detection region A of the touch screen can independently realize touch without affecting each other, the touch sensitivity of the touch screen is improved.

Figure 9:
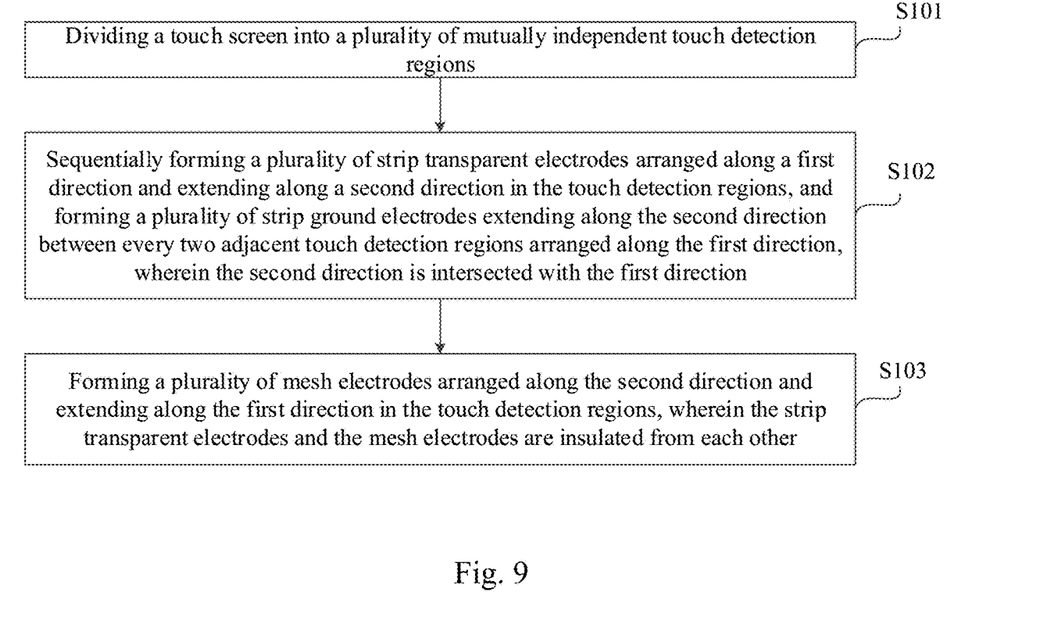
FIG. 9 is a flow diagram of a manufacturing method of the touch screen provided by the embodiment of the present disclosure.

Based on the same inventive concept, as shown in FIG. 9, the embodiment of the present disclosure provides a manufacturing method of the touch screen. The manufacturing method includes:

S101: the touch screen is divided into the plurality of mutually independent touch detection regions;

S102: the plurality of strip transparent electrodes arranged along the first direction and extending along the second direction are formed in each touch detection region, and the plurality of strip ground electrodes extending along the second direction are formed between every two adjacent touch detection regions arranged along the first direction, wherein the second direction is intersected with the first direction; and S103: the plurality of mesh electrodes arranged along the second direction and extending along the first direction are formed in each touch detection region, wherein the strip transparent electrodes and the mesh electrodes are insulated from each other.

In the specific implementation process, specific realizing processes of the steps S101 to S103 are as follows:

firstly, the touch screen is divided into the plurality of mutually independent touch detection regions; and then, the plurality of strip transparent electrodes arranged along the first direction and extending along the second direction are formed in each touch detection region in sequence, and meanwhile the strip ground electrodes extending along the second direction are formed between every two adjacent touch detection regions arranged along the first direction, wherein the second direction is intersected with the first direction. The touch screen includes the substrate. For example, when the plurality of strip transparent electrodes and the strip ground electrodes are all electrodes formed by the ITO conductive layers, an entire ITO conductive layer is plated on the substrate at first, i.e., the entire ITO layer is plated on regions corresponding to all the touch detection regions. Then, separate exposure is performed on each touch detection region. After separate exposure, uniform cleaning with a developing solution is carried out to form the patterned ITO conductive layers, thus forming a plurality of strip ITO electrodes and the plurality of strip ground electrodes of desired patterns. Then, the plurality of mesh electrodes arranged along the second direction and extending along the first direction are formed in each touch detection region, wherein the strip transparent electrodes and the mesh electrodes are insulated from each other. For example, when the plurality of mesh electrodes are metal mesh electrodes, an entire metal conductive layer is plated on each of the sides, away from the substrate, of the strip transparent electrodes in all the touch detection regions. Then, separate exposure is performed on each touch detection region. After the separate exposure, uniform cleaning with a developing solution is carried out to form patterned metal conductive layers, thus forming the plurality of mesh electrodes of desired patterns. Of course, in actual application, those of skilled in the art can also use other manufacturing processes to form the strip transparent electrodes, the strip ground electrodes, and the mesh electrodes, and it is not limited here.

In the embodiment of the present disclosure, at the step S102 that while the plurality of strip transparent electrodes arranged along the first direction and extending along the second direction are formed in each touch detection region, the method further includes:

a strip redundant electrode is formed between every two adjacent strip transparent electrodes in each touch detection region, wherein each mesh electrode overlaps the corresponding strip redundant electrode.

Plating the entire ITO conductive layer on the substrate is still taken as an example. That is, the entire ITO layer is plated on the regions corresponding to all the touch detection regions. Then, separate exposure is performed on each touch detection region. After separate exposure, uniform cleaning with the developing solution is carried out to form the plurality of strip ITO electrodes, the strip ground electrodes, and the strip redundant electrodes of the desired patterns.

In the embodiment of the present disclosure, at the step S103 that when the plurality of mesh electrodes arranged along the second direction and extending along the first direction are formed in each touch detection region, the method further includes:

the mesh redundant electrode extending along the first direction is formed between every two adjacent mesh electrodes.

Use of the metal mesh electrodes as the plurality of mesh electrodes is still taken as an example. Each entire metal conductive layer is plated on the corresponding one of the sides, away from the substrate, of the strip transparent electrodes in all the touch detection regions. Then, separate exposure is performed on each touch detection region. After separate exposure, uniform cleaning with the developing solution is carried out to form the plurality of mesh electrodes and the mesh redundant electrodes of the desired patterns.

In the embodiment of the present disclosure, after the plurality of strip ITO electrodes, the strip ground electrodes, and the strip redundant electrodes of the desired patterns are formed in each touch detection region, and before the plurality of mesh electrodes and the mesh redundant electrodes of the desired patterns are formed, the method further includes that: the sides, away from the substrate, of the ITO conductive layers are each coated with the corresponding entire first insulating layer. Then, separate exposure is performed on each touch detection region. After separate exposure, uniform cleaning with a developing solution is carried out, and first grooves are formed in the regions, corresponding to the strip redundant electrodes, on the first insulating layers. Contact conduction between the mesh electrodes and the strip redundant electrodes is realized through the first grooves.

In the embodiment of the present disclosure, after the plurality of mesh electrodes and the mesh redundant electrodes of the desired patterns are formed, the sides, away from the substrate, of the patterned metal conductive layers in all the touch detection regions are each coated with the corresponding entire second insulating layer, thereby protecting the touch screen.

According to the touch screen, the manufacturing method thereof, and the display device which are provided by the embodiments of the present disclosure, the plurality of strip transparent electrodes arranged along the first direction and extending along the second direction and the plurality of mesh electrodes arranged along the second direction and extending along the first direction are disposed in each touch detection region, and the strip transparent electrodes and the mesh electrodes are insulated from each other. Furthermore, the strip ground electrodes extending along the second direction and disposed on the same layer where the strip transparent electrodes are placed are disposed between every two adjacent touch detection regions arranged along the first direction. That is, the plurality of mesh electrodes overlap the plurality of strip transparent electrodes to form the corresponding touch detection regions, and the strip ground electrodes are disposed between every two adjacent touch detection regions, thereby ensuring independent touch of each touch detection region. Since each touch detection region of the touch screen can independently realize touch without affecting each other, the touch sensitivity of the touch screen is improved.

Obviously, those of skilled in the art can make various changes and modifications to the present disclosure without departing from the spirit and scope of the present disclosure. Therefore, if these changes and modifications of the present disclosure fall within the scope of the claims of the present disclosure and equivalent technologies of the present disclosure, the present disclosure is intended to include these changes and modifications.

The invention claimed is:

1. A touch screen, comprising:
a plurality of mutually independent touch detection regions, wherein
each of the touch detection regions comprises:
a plurality of strip transparent electrodes arranged in a first layer along a first direction and extending along a second direction;
a plurality of mesh electrodes arranged in a second layer along the second direction and extending along the first direction; wherein the strip transparent electrodes and the mesh electrodes are insulated from each other, the second direction is intersected with the first direction, and the second layer is arranged on the first layer; and
a plurality of strip redundant electrodes each located between every two adjacent strip transparent electrodes; wherein the plurality of strip redundant electrodes are electrically connected with the plurality of mesh electrodes in a one-to-one corresponding manner;
two strip ground electrodes, extending along the second direction, arranged in the first layer along the first direction, and located at two edges parallel to the second direction of the touch detection region, respectively; wherein the two strip ground electrodes are grounded;
wherein projections of the strip transparent electrodes, the strip redundant electrodes, and the two strip ground electrodes on the touch detection region are overlapped with a projection of the mesh electrodes on the touch detection region.

2. The touch screen according to claim 1, wherein the touch detection regions respectively further comprise a first insulating layer disposed between a layer where the strip transparent electrodes are placed and a layer where the mesh electrodes are placed; the first insulating layer comprises a hole structure opposite to the strip redundant electrodes; the mesh electrodes respectively overlap with the corresponding strip redundant electrodes through the hole structure; and an orthographic projection of any one of the strip redundant electrodes on the touch screen is greater than or equal to an orthographic projection of the hole structure on the touch screen.

3. The touch screen according to claim 1, wherein the strip redundant electrodes and the strip transparent electrodes have connection terminals on same sides.

4. The touch screen according to claim 1, wherein the touch detection region respectively further comprise a mesh redundant electrode located between every two adjacent mesh electrodes.

5. The touch screen according to claim 1, wherein the touch detection regions respectively further comprise a second insulating layer disposed on a side, away from a layer where the strip transparent electrodes are placed, of a layer where the mesh electrodes are placed.

6. The touch screen according to claim 1, wherein a shape of the mesh electrodes is rhombic, or square, or hexagonal.

7. A display device, comprising the touch screen according to claim 1.

8. The display device according to claim 7, wherein the touch detection regions respectively further comprise a first insulating layer disposed between a layer where the strip transparent electrodes are placed and a layer where the mesh electrodes are placed; the first insulating layer comprises a hole structure opposite to the strip redundant electrodes; the mesh electrodes respectively overlap with the corresponding strip redundant electrodes through the hole structure; and an orthographic projection of any one of the strip redundant electrodes on the touch screen is greater than or equal to an orthographic projection of the hole structure on the touch screen.

9. The display device according to claim 7, wherein the strip redundant electrodes and the strip transparent electrodes have connection terminals on same sides.

10. The display device according to claim 7, wherein the touch detection region respectively further comprise a mesh redundant electrode located between every two adjacent mesh electrodes.

11. The display device according to claim 7, wherein the touch detection regions respectively further comprise a second insulating layer disposed on a side, away from a layer where the strip transparent electrodes are placed, of a layer where the mesh electrodes are placed.

12. The display device according to claim 7, wherein a shape of the mesh electrodes is rhombic, or square, or hexagonal.

13. The display device according to claim 7, wherein an orthographic projection of the touch detection region on the touch screen is slightly larger than an orthographic projection of a display region on the touch screen.

14. A manufacturing method of a touch screen, comprising:
dividing the touch screen into a plurality of mutually independent touch detection regions;
sequentially forming a plurality of strip transparent electrodes arranged in a first layer along a first direction and extending along a second direction in each of the touch detection regions, and forming two strip ground electrodes, extending along the second direction, arranged in the first layer along the first direction at two edges parallel to the second direction of each of the touch detection region, respectively; wherein the second direction is intersected with the first direction; and
forming a plurality of mesh electrodes arranged in a second layer along the second direction and extending along the first direction in the touch detection regions, wherein the strip transparent electrodes and the mesh electrodes are insulated from each other, and the second layer is arranged on the first layer;
forming a plurality of strip redundant electrodes each located between every two adjacent strip transparent electrodes; wherein the plurality of strip redundant electrodes are electrically connected with the plurality of mesh electrodes in a one-to-one corresponding manner;
wherein projections of the strip transparent electrodes, the strip redundant electrodes, and the two strip ground electrodes on the touch detection region are overlapped with a projection of the mesh electrodes on the touch detection region.

15. The method according to claim 14, wherein when forming the plurality of mesh electrodes arranged along the second direction and extending along the first direction in the touch detection regions, the method further comprises:
forming a mesh redundant electrode extending along the first direction between every two adjacent mesh electrodes.

* * * * *